US012269275B2

(12) United States Patent
Hayashi et al.

(10) Patent No.: US 12,269,275 B2
(45) Date of Patent: Apr. 8, 2025

(54) LIQUID DISCHARGE APPARATUS

(71) Applicant: BROTHER KOGYO KABUSHIKI KAISHA, Nagoya (JP)

(72) Inventors: Hideki Hayashi, Nagoya (JP); Itta Yamada, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 182 days.

(21) Appl. No.: 18/065,760

(22) Filed: Dec. 14, 2022

(65) Prior Publication Data

US 2023/0347657 A1 Nov. 2, 2023

(30) Foreign Application Priority Data

Apr. 28, 2022 (JP) ................................ 2022-074931

(51) Int. Cl.
*B41J 2/175* (2006.01)

(52) U.S. Cl.
CPC ................................ *B41J 2/17596* (2013.01)

(58) Field of Classification Search
CPC .... B41J 2/17596; B41J 2/175; B41J 2/17556; B41J 2/18; B41J 29/38
See application file for complete search history.

(56) References Cited

U.S. PATENT DOCUMENTS

2020/0079093 A1* 3/2020 Sato .................... B41J 2/17506

FOREIGN PATENT DOCUMENTS

JP 2012-11670 A 1/2012
JP 2016-68327 A 5/2016

* cited by examiner

*Primary Examiner* — Lisa Solomon
(74) *Attorney, Agent, or Firm* — Merchant & Gould P.C.

(57) ABSTRACT

There is provided a liquid discharge apparatus including: a reservoir configured to store a liquid; a head in which a nozzle is opened; a liquid circulator including a negative pressure pump, the liquid circulator being configured to circulate the liquid between the reservoir and the nozzle; a negative pressure regulating valve configured to regulate communication between a gas layer of the reservoir and an atmosphere; and a controller configured to perform: obtaining a nozzle pressure in an area, of the liquid circulator, near the nozzle; and controlling the negative pressure regulating valve to open, in response to the nozzle pressure being less than a first threshold value that is a negative value and greater than a second threshold value that is less than the first threshold value.

6 Claims, 9 Drawing Sheets

LIQUID DISCHARGE APPARATUS

REFERENCE TO RELATED APPLICATIONS

This application claims priorities from Japanese Patent Application No. 2022-074931 filed on Apr. 28, 2022. The entire content of the priority application is incorporated herein by reference.

BACKGROUND ART

An image recording apparatus having an ink-circulation mechanism are known. In a known image recording apparatus has a pressure regulating section on the ink-circulation channel that regulates the pressure in the ink-circulation channel. The pressure regulation section regulates the pressure change on the larger of the positive pressure and the negative pressure in the image recording section at the start of ink-circulation. With this, the nozzle pressure in the image recording section is maintained within an appropriate range.

DESCRIPTION

In a liquid discharge apparatus that circulates liquid and ejects the liquid from nozzles, if the nozzle pressure becomes large, liquid may leak from the nozzles and the image quality of the recorded image may deteriorate. If the nozzle pressure becomes small, air may enter through the nozzles, preventing proper image recording. Therefore, when the nozzle pressure becomes too high or too low beyond a predetermined level, the circulation of liquid must be stopped, followed by maintenance processing.

However, if the liquid circulation is stopped and maintenance processing is performed each time the nozzle pressure falls below the predetermined level, the image recording time becomes longer and the amount of liquid consumed increases.

The present disclosure is made in view of the above circumstances, and its purpose is to provide a means by which liquid circulation is stopped in accordance with the nozzle pressure.

According to an aspect of the present disclosure, there is provided a liquid discharge apparatus including: a reservoir, a head in which a nozzle is opened, a liquid circulator, a negative pressure regulating valve and a controller. The reservoir is configured to store a liquid. The liquid circulator includes a negative pressure pump. The liquid circulator is configured to circulate the liquid between the reservoir and the nozzle. The negative pressure regulating valve is configured to regulate communication between a gas layer of the reservoir and an atmosphere. The controller is configured to perform: obtaining a nozzle pressure in an area, of the liquid circulator, near the nozzle; and controlling the negative pressure regulating valve to open, in response to the nozzle pressure being less than a first threshold value that is a negative value and greater than a second threshold value that is less than the first threshold value.

When the nozzle pressure is lower than the first threshold value and higher than the second threshold value, the liquid circulation is not stopped unconditionally, but the nozzle pressure is increased by opening the negative pressure adjustment valve, thereby bringing the pressure of the gas layer in the reservoir closer to the atmospheric pressure. Therefore, the liquid circulation can be suitably stopped based on the nozzle pressure without stopping the liquid circulation more than necessary.

Figure 4A:
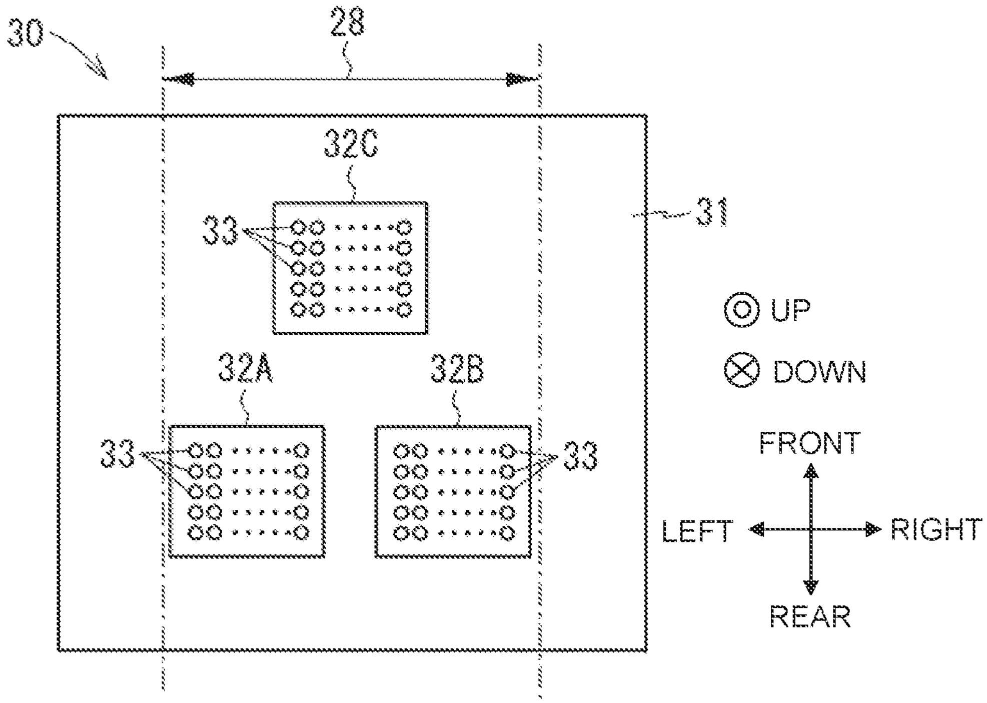
Figure 4B:
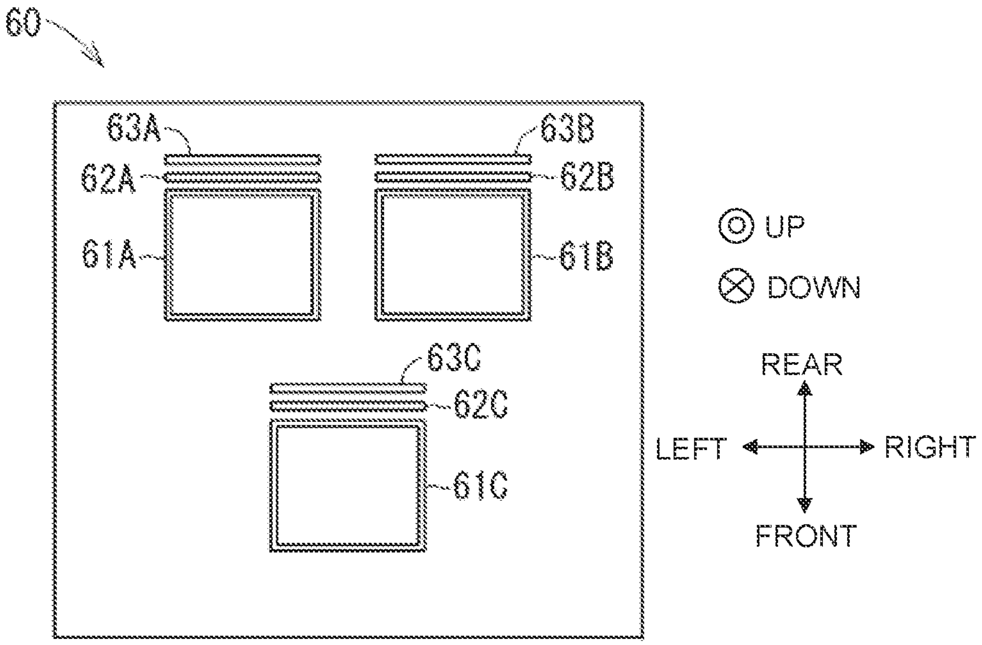

FIG. 4A depicts a schematic diagram depicting the nozzle surface 31 of the head 30, and FIG. 4B depicts a schematic diagram depicting the top of the maintenance section 60.

Figure 5A:
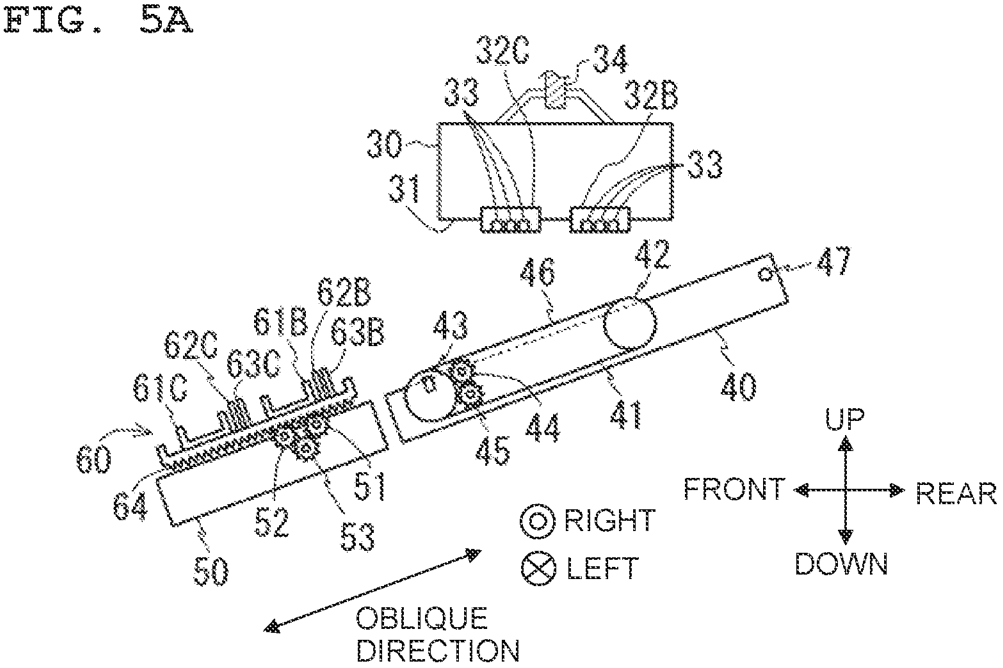
Figure 5B:
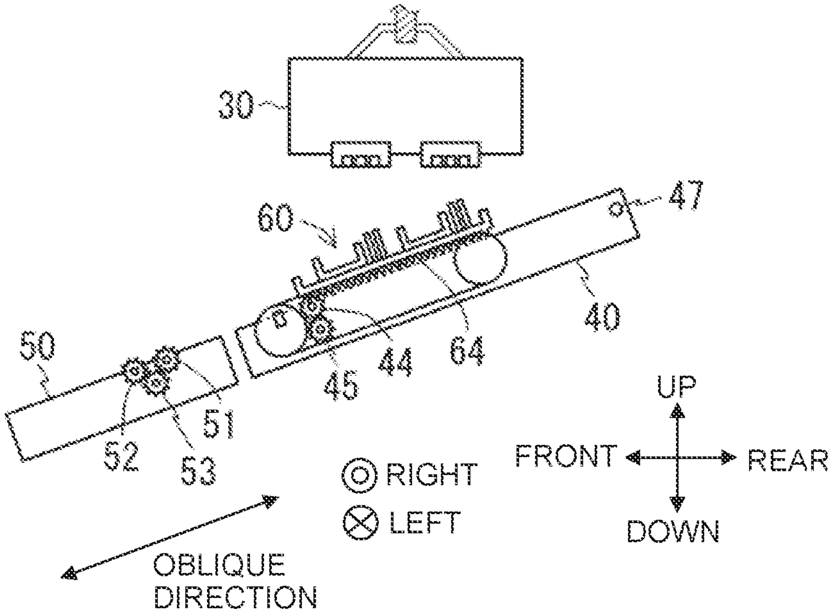

FIG. 5A depicts the first support 40 moved to the tilted position, and FIG. 5B depicts the maintenance section 60 moved onto the first support 40.

Figure 6A:
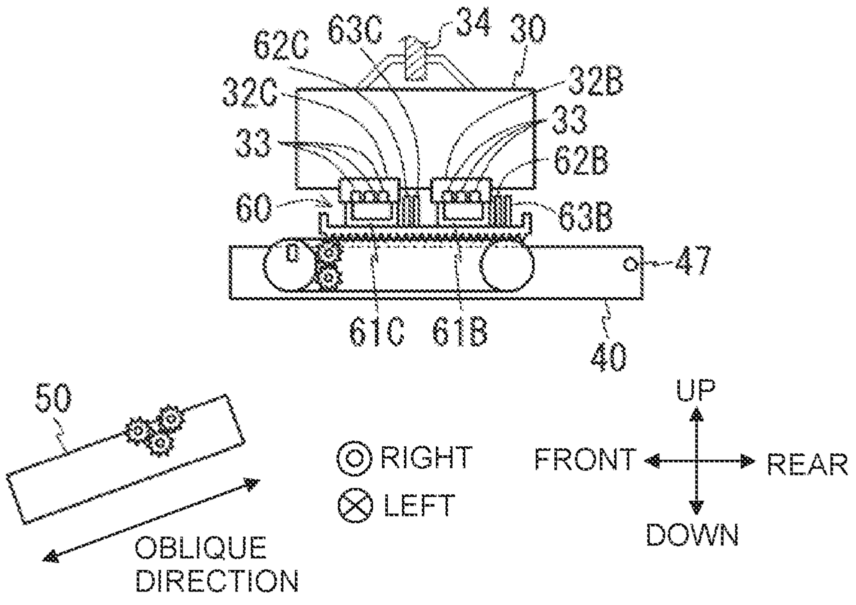
Figure 6B:
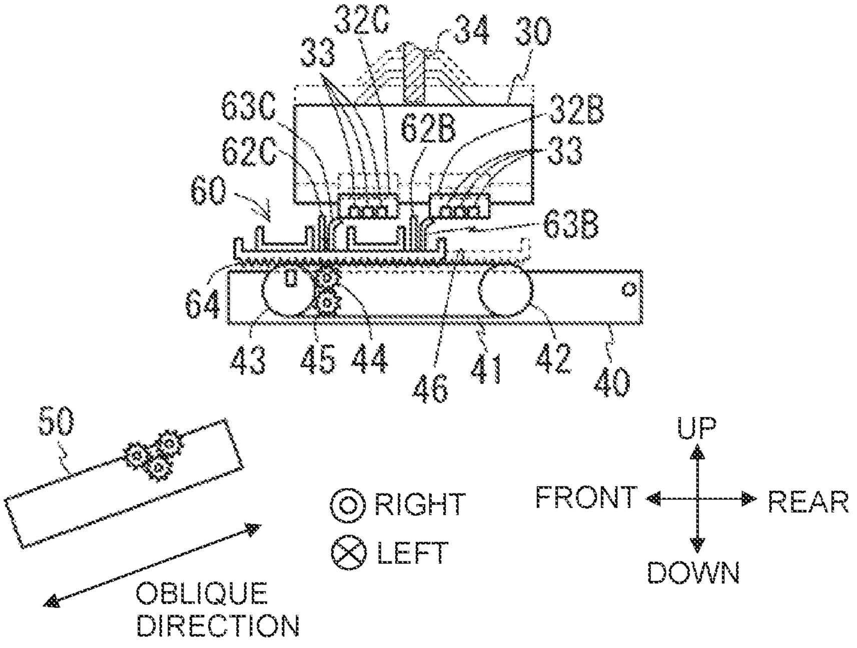

FIG. 6A depicts the cap 61 covering the ejection section 32, and FIG. 6B depicts the wipers of the maintenance section 60 wiping the ejection section 32.

Figure 7:
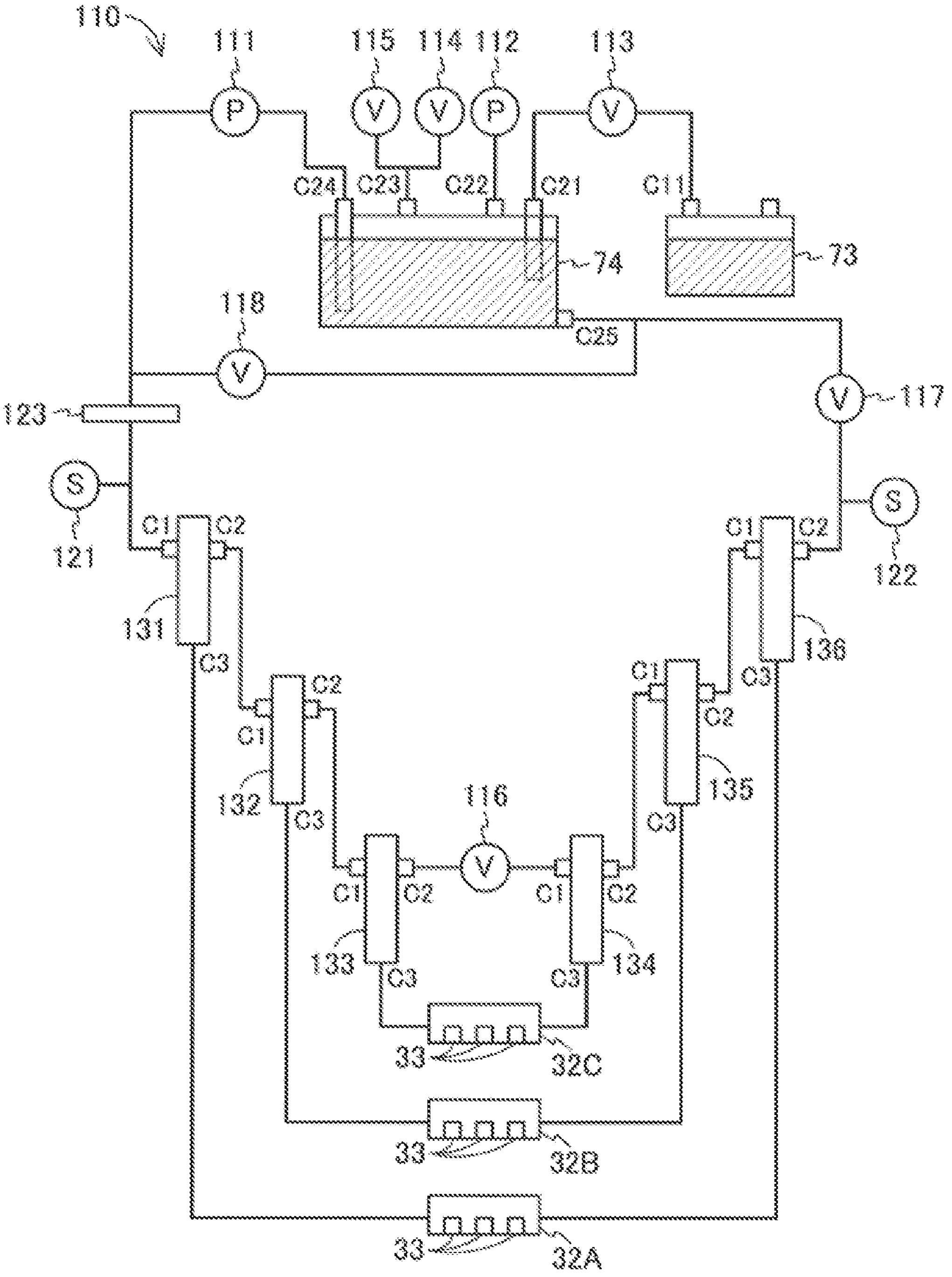

FIG. 7 depicts the configuration of the ink-circulation section 110.

Figure 8A:
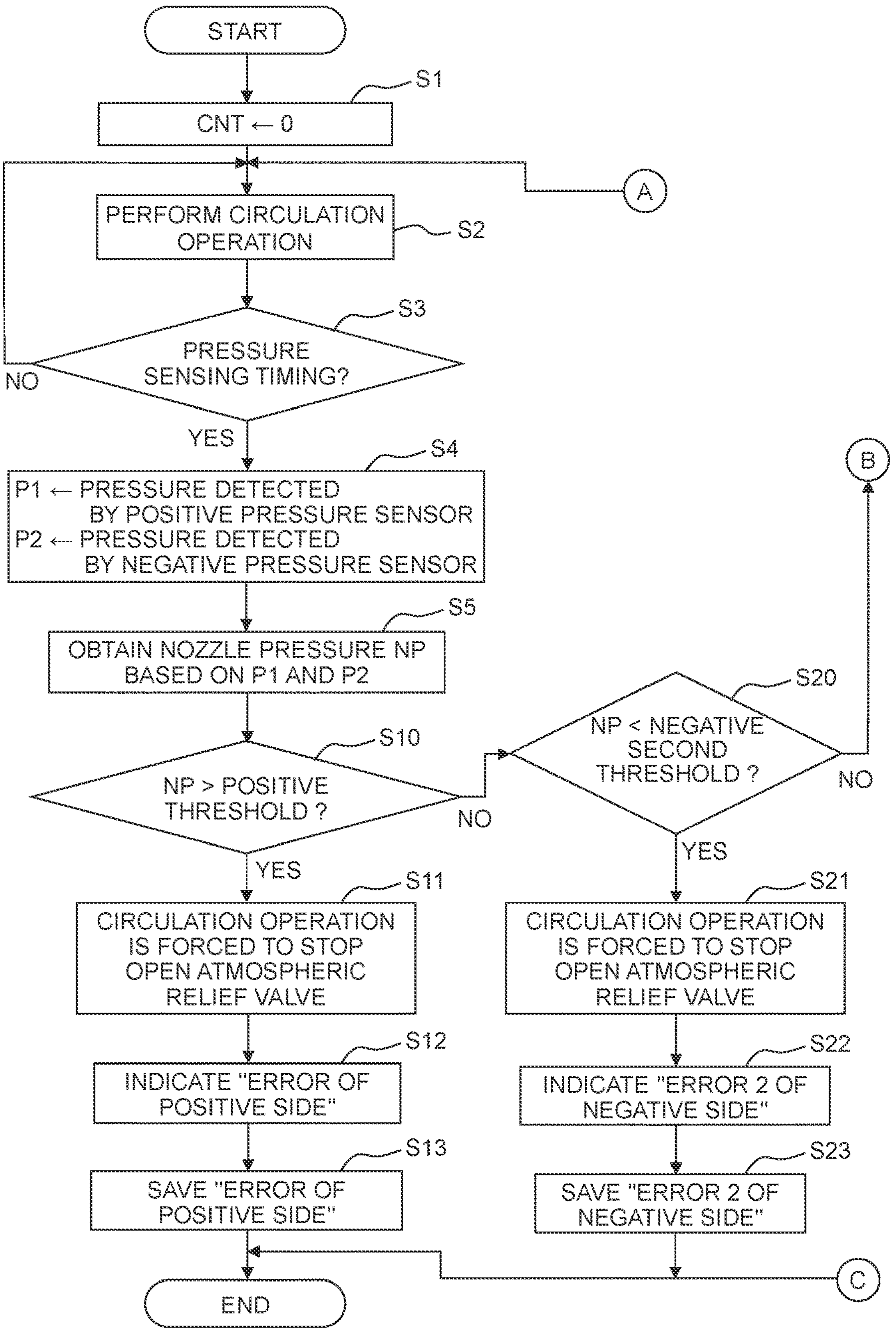
Figure 8B:
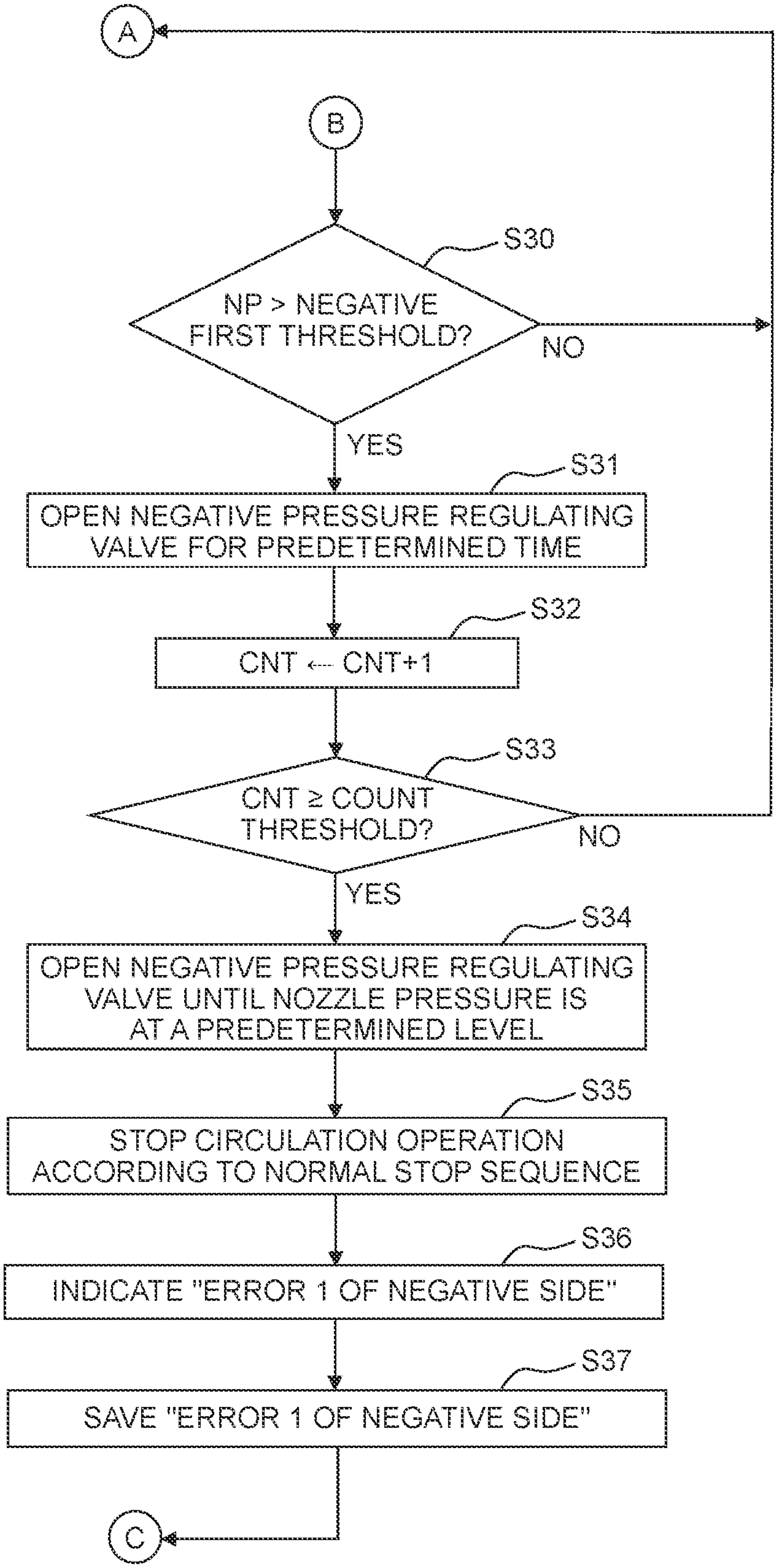

FIGS. 8A and 8B depict a flowchart of error processing based on nozzle pressure by controller 100.

Embodiments of the present disclosure are described below. It goes without saying that the embodiments described below are only an example of the present disclosure and that the embodiments of the present disclosure can be changed as necessary to the extent that the gist of the present disclosure is not changed. The up-down direction is defined with respect to the state in which the printer 10 is installed ready for use (the state depicted in FIG. 1), the front-rear direction is defined with respect to the front surface of the printer 10 on which the discharge port 13 is formed, and the left-right direction is defined with respect to the printer 10 viewed from the front surface. The up-down direction, front-rear direction, and left-right direction are orthogonal to each other.

<Printer 10 Overview>

The printer 10 is an example of a liquid discharge apparatus that ejects or discharges ink onto a sheet using the inkjet printing method. The ink is an example of a liquid. Printer 10 is a monochrome printer that ejects black ink onto a sheet.

Figure 1:
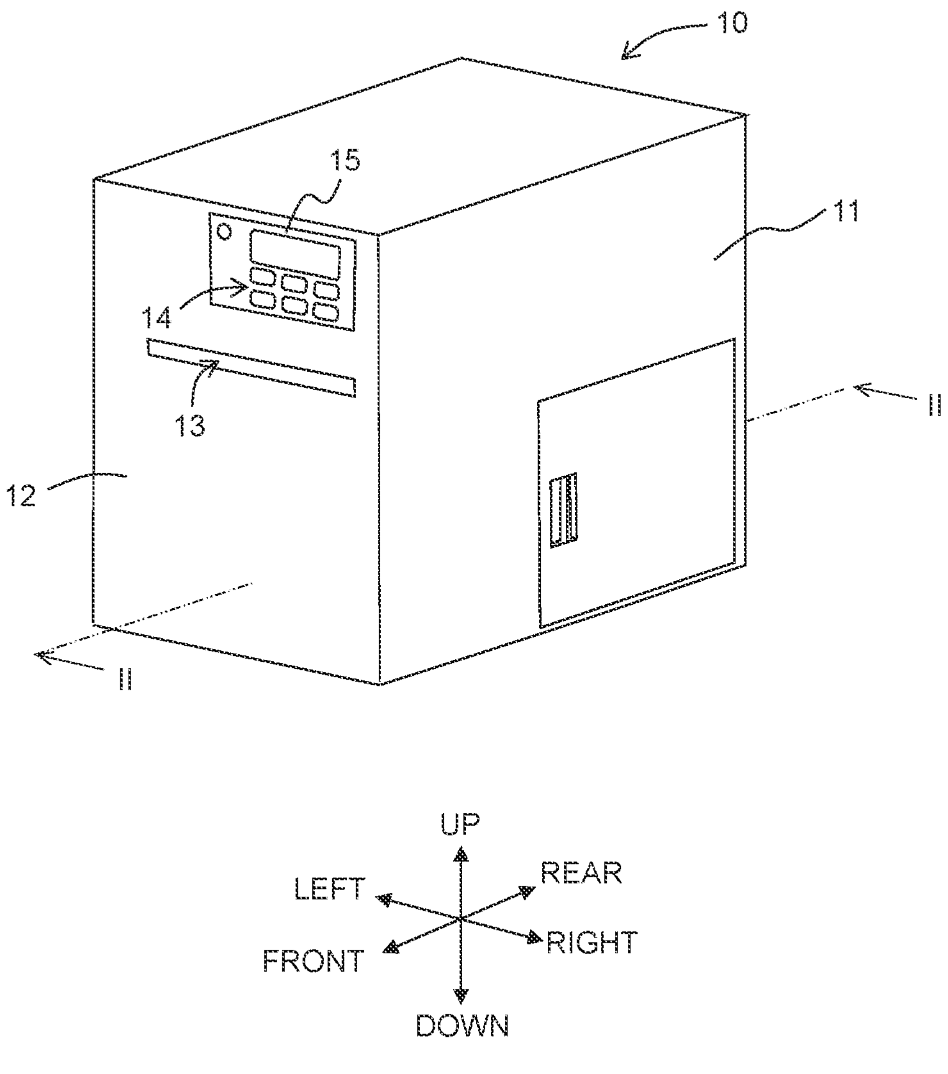
FIG. 1 depicts an external view of the printer 10.

As depicted in FIG. 1, the printer 10 has a housing 11 having a rectangular shape. The housing 11 has a size that allows it to be placed on a tabletop, for example. The printer 10 is used on a tabletop, floor, or rack.

The discharge port 13, control panel 14, and display 15 are located on the front face 12 of the housing 11. The discharge port 13 is slit-shaped and is elongated in the left-right direction. A sheet S (see FIG. 2) with a recorded image is discharged from the discharge port 13. The operation panel 14 is operated by the user of the printer 10. The user inputs various instructions, settings, etc. to the printer 10 by operating the operation panel 14. The display 15 displays various information such as status information of the printer 10. The display 15 indicates, for example, that an error has occurred in the printer 10.

<Internal Configuration of Printer 10>

Figure 2:
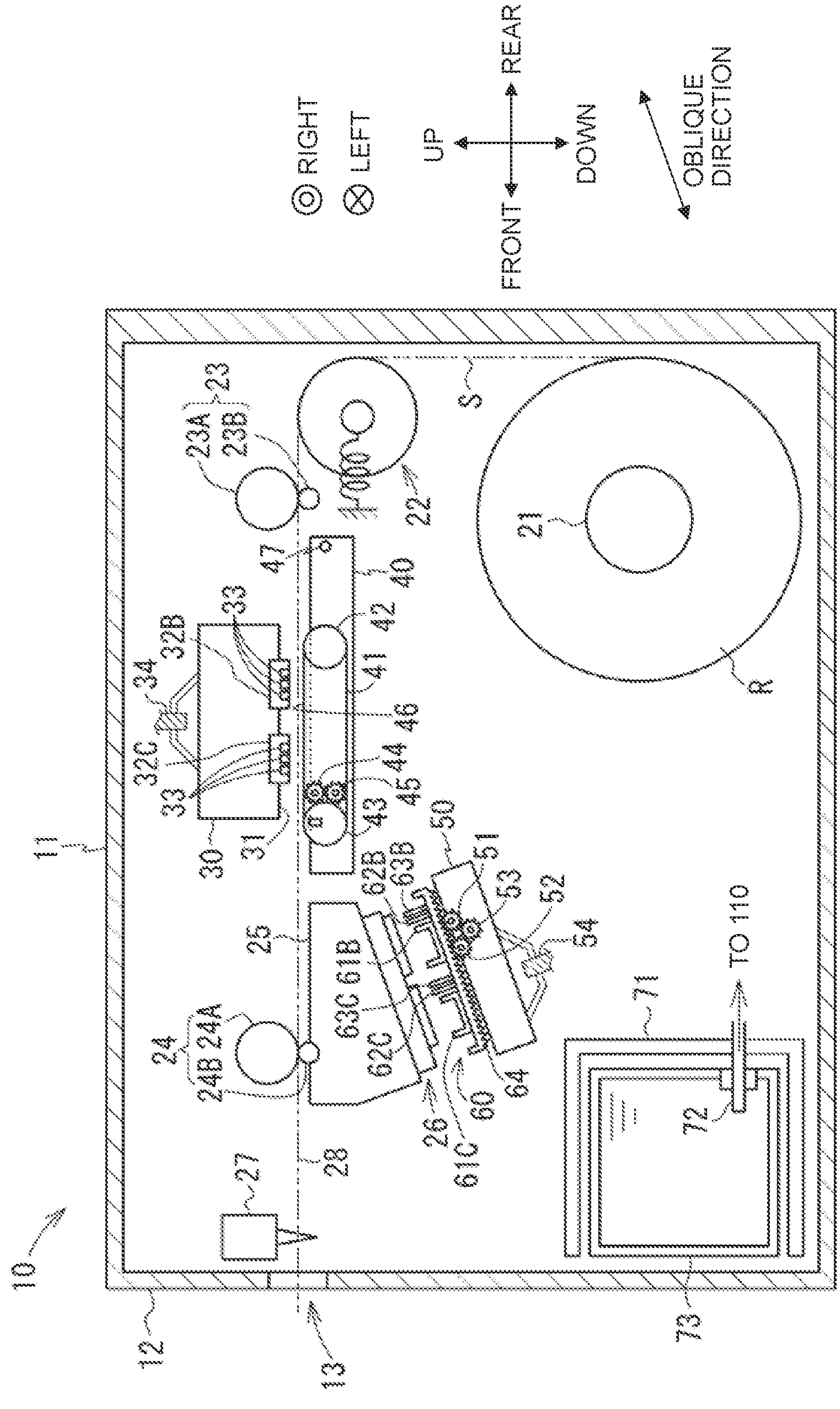
FIG. 2 depicts a cross-sectional view as viewed from the II-II lines of FIG. 1.

As depicted in FIG. 2, the holder 21, tensioner 22, conveyance roller pair 23, conveyance roller pair 24, support 25, wiper cleaner 26, cutter 27, head 30, first support 40, second support 50, maintenance section 60, and mounting case 71 are located within the housing 11. Although not depicted in FIG. 2, the controller 100 (see FIG. 3), ink-circulation section 110, sub-tank 74 (see FIG. 7), and other components are located within the housing 11. In addition, the cleaning liquid tank, cleaning liquid pump, waste liquid tank (all not depicted), etc. are located within the housing 11. The ink-circulation section 110 is an example of a liquid circulator. The sub-tank 74 is an example of a reservoir.

Within the housing 11, the holder 21 extends in the left-right direction. A roll body R on which a long sheet S is wound around a core tube (not depicted) is attached to the holder 21. The holder 21 supports the roll body R so that the roll body R can rotate in the circumferential direction of the core tube. The holder 21 rotates with the driving force transmitted from the conveyance motor 81 (see FIG. 3). As the holder 21 rotates, the roll body R supported by the holder 21 also rotates.

The sheet S is drawn upward from the rear end of the roll R and guided to the tensioner 22. A conveyance roller pair 23 including conveyance roller 23A and pinch rollers 23B is located in front of the tensioner 22. A conveyance roller pair 24 including conveyance roller 24A and pinch roller 24B is located in front of conveyance roller pair 23.

Figure 3:
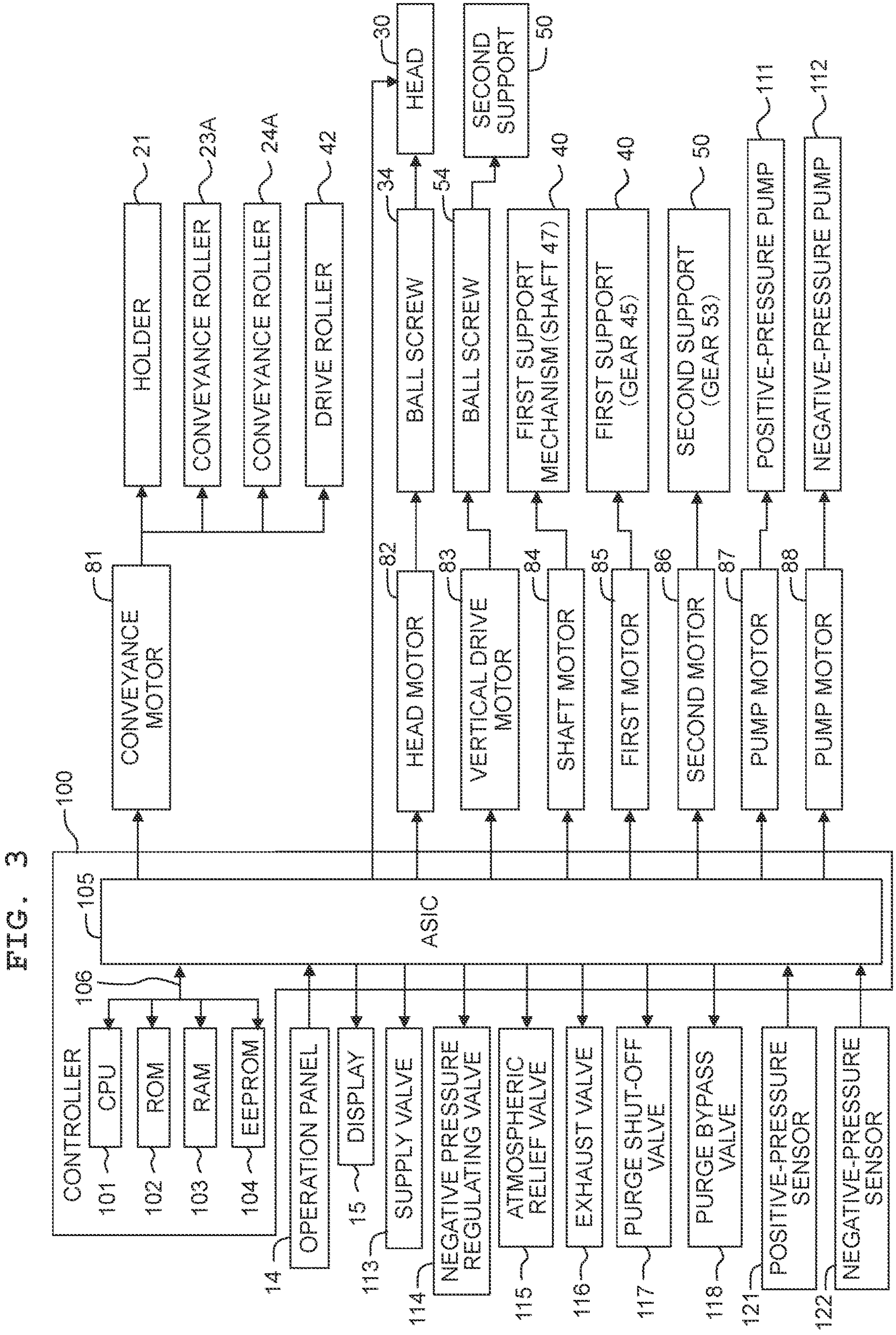
FIG. 3 depicts a block diagram of the printer 10.

The conveyance rollers 23A and 24A rotate when driving force is transmitted from conveyance motor 81 (see FIG. 3). The conveyance roller pair 23 rotates while nipping a sheet S extending frontward from tensioner 22, thereby feeding the sheet S frontward. The conveyance roller pair 24 feeds the sheet S further frontward by rotating while nipping the sheet S fed from the conveyance roller pair 23. The sheet S fed from the conveyance roller pair 24 is cut to the desired length by the cutter 27 located near the discharge port 13, and is discharged from the discharge port 13. The two dotted lines in FIG. 2 indicate the conveyance path 28 of the sheet S.

The head 30 is located above the conveyance path 28, downstream of the conveyance roller pair 23 in the conveyance direction. The lower surface of the head 30 is referred to as the nozzle surface 31. The nozzle surface 31 has a plurality of nozzles 33 opening downward. From the plurality of nozzles 33, ink is ejected downwardly toward the sheet S supported by the conveyance belt 41. As a result, an image is recorded on the sheet S.

The first support 40 is located below and opposite the head 30. The first support 40 has a conveyance belt 41, a drive roller 42, a driven roller 43, and gears 44 and 45. The conveyance belt 41 supports the sheet S that is conveyed by the conveyance roller pair 23 and positioned directly below the head 30. The conveyance belt 41 transports the supported sheet S in the frontward direction. As will be described below, the first support 40 can support the maintenance section 60.

The drive roller 42 and the driven roller 43 are positioned apart in the front-rear direction. The conveyance belt 41 is an atraumatic belt and is stretched over the drive roller 42 and driven roller 43. The conveyance belt 41 is located in the conveyance path 28 in the left-right direction.

The drive roller 42 rotates with the driving force transmitted from the conveyance motor 81 (see FIG. 3) to rotate the conveyance belt 41. The driven roller 43 rotates with the rotation of the conveyance belt 41. The upper portion on the outer circumference of the conveyance belt 41 serves as the conveyance surface 46 of the sheet S. The conveyance surface 46 provides a conveyance force to the sheet S while supporting the sheet S being conveyed between the conveyance roller pairs 23 and 24 from below. As a result, the sheet S located in the conveyance path 28 is conveyed in the frontward direction.

The first support 40 has a shaft 47 extending in the left-right direction. The shaft 47 is rotatably supported by the housing 11. The shaft 47 is located upstream of the drive roller 42 in the conveyance direction and below the conveyance roller pair 23. The shaft 47 rotates when the driving force is transmitted from the shaft motor 84 (see FIG. 3). As the shaft 47 rotates, the first support 40 rotates around the shaft 47 and moves between a horizontal position parallel to the nozzle surface 31 of head 30 (see FIG. 2) and an inclined position parallel to the top surface of the second support 50 (see FIG. 5A).

The gears 44 and 45 are rotatably supported by the first support 40. The gear 45 rotates when driving force is transmitted from the first motor 85 (see FIG. 3) directly or through some gears or the like.

The support 25 is located downstream of the conveyance path 28 and below the conveyance roller 24A from the head 30 and the first support 40. The lower surface of the support 25 is parallel to the oblique direction. The oblique direction is perpendicular to the left-right direction and is a direction that moves downward as it moves frontward. The wiper cleaner 26 is located on the lower surface of the support section 25. The wiper cleaner 26 is supplied with cleaning solution from a cleaning solution tank by means not depicted.

The second support 50 is located below and diagonally behind the support 25. The second support 50 has gears 51 to 53. The second support 50 is disposed as a whole in an oblique direction. The second support 50 supports the maintenance section 60 in standby.

To move the second support 50 in the oblique direction and in the direction orthogonal to the left-right direction (hereinafter referred to as the orthogonal direction), the second support 50 is attached to the nut member of a ball screw 54. The screw shaft of the ball screw 54 is rotatably supported by the housing 11 around an axis along the orthogonal direction. The screw shaft rotates with the driving force transmitted from the vertical drive motor 83 (see FIG. 3). The nut member of the ball screw 54 moves obliquely upward or downward along the orthogonal direction by rotation of the screw shaft. As a result, the second support 50 moves along the orthogonal direction to a position closer to the wiper cleaner 26 and to a position away from the wiper cleaner 26. When the second support 50 is in the former position, the wiper cleaner 26 cleans the wipers (described below) of the maintenance section 60.

The gears 51 to 53 are rotatably supported by the second support 50. The gear 53 is meshed with gears 51 and 52. The gear 53 rotates by being given a driving force from the second motor 86 (see FIG. 3) directly or through some gears or the like. When the gear 53 rotates, the gears 51 and 52 rotate in the same direction. The gears 51 and 52 can mesh with a rack 64 located on the lower surface of maintenance section 60 in opposing positions.

The mounting case 71 is located in the front lower part of the housing 11 and is box-shaped with a frontward-facing opening. The mounting case 71 has an ink needle 72. An ink cartridge 73 is mounted into the mounting case 71 such that the ink cartridge 73 is inserted from the rear-face thereof. The ink cartridge 73 stores ink containing pigments and other substances. When the ink cartridge 73 is mounted in the mounting case 71, the ink needle 72 is inserted into the ink outlet of the ink cartridge 73. The ink needle 72 is connected to the ink-circulation section 110 depicted in FIG. 7. The ink stored in the ink cartridge 73 mounted in the mounting case 71 is supplied to the sub-tank 74 (see FIG. 7) and from the sub-tank 74 to the nozzles 33 of the head 30 via the ink-circulation section 110.

<Head 30>

As depicted in FIGS. 2 and 4A, three ejection sections 32A to 32C are located on the nozzle surface 31 of the head 30. The ejection sections 32A to 32C each have a plurality of nozzles 33 aligned in two dimensions. The ejection sections 32A to 32C are located in the conveyance path 28 in the left-right direction. The ejection sections 32A and 32B are disposed at the same position in the front-rear direction and spaced apart in the left-right direction. The ejection section 32C is disposed in front of and between the ejection sections 32A and 32B in the left-right direction. The left end of the ejection section 32C is to the left of the right end of the ejection section 32A. The right end of the ejection section 32C is located to the right of the left end of the ejection section 32B. The number of the ejection sections 32 included in the head 30 is not limited to three, but may be any number.

To move the head 30 in the up-down direction, the head 30 is attached to the nut member of the ball screw 34. The screw shaft of the ball screw 34 is supported by the housing 11 for rotation around an axis along the up-down direction. The screw shaft rotates with the driving force transmitted from the head motor 82 (see FIG. 3). The nut member of the ball screw 34 moves upward or downward by rotation of the screw shaft. As a result, the head 30 moves along the up-down direction to the recording position depicted in FIG. 2, the capped position depicted in FIG. 6A, the wiped position depicted in FIG. 6B in solid line, and the uncapped position depicted in FIG. 6B in dashed line.

<Maintenance Section 60>

The maintenance section 60 is a component for performing maintenance on the head 30. The maintenance section 60 is movable. The maintenance section 60 is supported by the second support 50 during standby (see FIGS. 2 and 5A). When maintenance of the head 30 is performed, the maintenance section 60 is supported by the first support 40 and moved directly under the head 30 (see FIGS. 5B and 6).

As depicted in FIGS. 2 and 4B, three caps 61A to 61C, three sponge wipers 62A to 62C, and three rubber wipers 63A to 63C are located on the top surface of maintenance section 60. The caps 61A to 61C are made of rubber, silicone, or other elastic material and have a box shape with an open top. The caps 61A to 61C are positioned to cover the ejection sections 32A to 32C when the head 30 is in the capped position and the maintenance section 60 is in the maintenance position (described below). The caps 61A to 61C are supplied with a cleaning solution from a cleaning solution tank by means not depicted.

The sponge wipers 62A to 62C are formed by the sponge. The rubber wipers 63A to 63C are formed by rubber. The sponge wipers 62A to 62C and the rubber wipers 63A to 63C have an elongated shape in the left-right direction. The length of the sponge wipers 62A to 62C in the left-right direction is longer than the length in the left-right direction of an area in which the nozzle 33 is located in the ejection section 32A to 32C, respectively. The length of the rubber wipers 63A to 63C in the left-right direction is equal to the length of the sponge wipers 62A to 62C in the left-right direction, respectively. The height of the rubber wipers 63A to 63C is equivalent to the length of the sponge wipers 62A to 62C in the left-right direction, respectively. As depicted in FIG. 4B, the sponge wipers 62A to 62C are each positioned behind the caps 61A to 61C, parallel to the rear edge of the caps 61A to 61C. The rubber wipers 63A to 63C are positioned behind the sponge wipers 62A to 62C, respectively, parallel to the sponge wipers 62A to 62C.

The rack 64 is located on a portion of the lower surface of the maintenance section 60. The gears 44 of first support 40 and the gears 51 and 52 of second support 50 can engage the rack 64. When the gear 53 rotates with at least one of the rack 64 and the gears 51 and 52 engaged, the maintenance section 60 moves along the upper surface of the second support 50. Rotation of the gear 45 with the rack 64 and the gear 44 engaged causes the maintenance section 60 to move along the upper surface of the first support 40. When the first support 40 is in the inclined position, the front end of the first support 40 is located near the rear end of the second support 50, and the top surface of the first support 40 and the top surface of the second support 50 are on the same plane (see FIG. 5A). Therefore, the maintenance section 60 can move to the standby position depicted in FIGS. 2 and 5A, the standby position depicted in FIG. 6B with a dashed line, the maintenance position depicted in FIG. 6A, and the wipe position depicted in FIG. 6B with a solid line.

<Maintenance Process for Head 30>

The printer 10 executes a purge process, a cap cleaning process, and a wiping process as maintenance processes for head 30. The purge and cap cleaning processes are performed when the head 30 is in the capped position and the maintenance section 60 is in the maintenance position (as depicted in FIG. 6A). The purge process is to suck ink from the nozzles 33 by a suction pump (not depicted) with the caps 61A to 61C of the maintenance section 60 covering the ejection sections 32A to 32C of the head 30, respectively. The cap cleaning process is a process to clean the nozzle surface 31 of the head 30 by means of a cleaning solution supplied to the cap 61 under the same conditions as the purge process. The wiping process is performed with the head 30 in the wiped position and the maintenance section 60 in the wipe position (as depicted in FIG. 6B). In the wiping process, the nozzle surface 31 of the head 30 is wiped with the sponge wipers 62A to 62C and the rubber wipers 63A to 63C of the maintenance section 60.

<Controller 100>

As depicted in FIG. 3, the controller 100 has a CPU 101, a ROM 102, a RAM 103, an EEPROM 104, and an ASIC 105. The ROM 102 stores programs, etc. for CPU 101 to execute various processes, and the RAM 103 is used as a storage area to temporarily record data, signals, etc. used when the CPU 101 executes programs, or as a work area for data processing. The EEPROM 104 stores information that should be retained after the power is turned off.

The ASIC 105 receives signals from the sensors in printer 10 and controls the motors and valves in printer 10 according to the control from the CPU 101. The controller 100 drives each motor through the ASIC 105 to rotate each motor and rotate the components connected to each motor. The controller 100 also outputs drive signals to the drive elements (not depicted) of the head 30 through the ASIC 105 to eject ink from the nozzles 33 of the head 30. The ASIC 105 outputs the drive signals according to the amount of ink to be ejected from the nozzles 33. The operation panel 14 and the display 15 are connected to the ASIC 105.

<Ink-Circulation Section 110>

The ink-circulation section 110 of the printer 10 is described below with reference to FIG. 7. The ink-circulation section 110 depicted in FIG. 7 includes a positive pressure pump 111, a negative pressure pump 112, a supply valve 113, a negative pressure regulating valve 114, an atmosphere release valve 115, an exhaust valve 116, a purge shutoff valve 117, a purge bypass valve 118, a positive pressure sensor 121, a negative pressure sensor 122, a filter 123, six FE joints 131 to 136, and a plurality of tubes connecting these elements. The ink-circulation section 110 supplies ink stored in the ink cartridge 73 to the sub-tank 74 and circulates ink between the sub-tank 74 and the nozzles 33 of the head 30.

The ink cartridge 73 has a connection port C11. The sub-tank 74 has five connection ports C21 to C25. The connection ports C21 to C24 are provided on the top surface of the sub-tank 74 and are connected to the air layer (air-filled portion) of the sub-tank 74. The connection port C25 is provided on the side of the sub-tank 74 and is connected to the liquid layer (the portion containing ink) of the sub-tank 74. The FE joints 131 to 136 each have three connection ports C1 to C3 and interconnect the connection ports C1 to C3 internally.

One end of the supply valve 113 is connected to the connection port C11 of the ink cartridge 73. The other end of the supply valve 113 is connected to the connection port C21 of the sub-tank 74. One end of the negative pressure pump 112 is connected to the connection port C22 of the sub-tank 74. One end of the negative pressure regulating valve 114 and one end of the atmospheric relief valve 115 are connected to the connection port C23 of the sub-tank 74. The other end of the negative pressure pump 112, the other end of the negative pressure regulating valve 114, and the other end of the atmospheric relief valve 115 are open to the atmosphere.

One end of the positive pressure pump 111 is connected to the connection port C24 of the sub-tank 74. The other end of the positive pressure pump 111 is connected to one end of the purge bypass valve 118 and to the connection port C1 of the FE joint 131 via the filter 123. The connection port C2 of the FE joint 131 is connected to the connection port C1 of the FE joint 132. The connection port C2 of the FE joint 132 is connected to the connection port C1 of the FE joint 133. The connection port C2 of FE joint 133 is connected to one end of the exhaust valve 116. The other end of the exhaust valve 116 is connected to the connection port C1 of the FE joint 134.

The connection port C3 of FE joint 131 is connected to one end of the ejection section 32A of the head 30. The other end of the ejection section 32A is connected to the connection port C3 of the FE joint 136. The connection port C3 of FE joint 132 is connected to one end of the ejection section 32B of the head 30. The other end of the ejection section 32B is connected to the connection port C3 of the FE joint 135. The connection port C3 of the FE joint 133 is connected to one end of the ejection section 32C of the head 30. The other end of the ejection section 32C is connected to the connection port C3 of the FE joint 134.

The connection port C2 of the FE joint 134 is connected to the connection port C1 of the FE joint 135. The connection port C2 of the FE joint 135 is connected to the connection port C1 of the FE joint 136. The connection port C2 of the FE joint 136 is connected to one end of the purge shutoff valve 117. The other end of the purge shutoff valve 117 is connected to the other end of the purge bypass valve 118 and the connection port C25 of sub-tank 74.

The positive displacement pump 111 is located on the ink channel of the ink-circulation section 110. The positive pressure pump 111 rotates with the driving force transmitted from the pump motor 87 (see FIG. 3). As the positive pressure pump 111 rotates, it pushes ink into the ink channel in the ink-circulation section 110. The negative pressure pump 112 is not located on the ink channel, but is connected to the air layer of the sub-tank 74. The negative pressure pump 112 rotates with the driving force transmitted from the pump motor 88 (see FIG. 3). The negative pressure pump 112 rotates to apply negative pressure to the sub-tank 74, thereby drawing ink into the ink channels in the ink-circulation section 110 through the air.

This configuration reduces a pulsation occurred when both the positive pressure pump 111 and the negative pressure pump 112 are operating. Since pulsation occurs in the positive pressure pump 111 but not in the negative pressure pump 112, the pressure from the negative pressure pump 112 does not interfere with the pressure from the positive pressure pump 111. Therefore, even when both the positive pressure pump 111 and the negative pressure pump 112 are operating, no significant pulsation occurs. The pressure due to the positive pressure pump 111 can be absorbed by installing a damper film (not depicted) in the ink channel connecting the positive pressure pump 111 and the filter 123.

The negative pressure regulating valve 114 controls the connection between the gas layer of the sub-tank 74 and the atmosphere. The negative pressure regulating valve 114 is a normal-closed solenoid valve. The normal-closed solenoid valve has a spring, and while current is not flowing, the valve is closed due to the elastic force of the spring. When the current flows, the electromagnetic force becomes greater than the elastic force of the spring, and the valve is opened. The normal-closed solenoid valve has the characteristic of fast opening and closing speed. On the other hand, the atmospheric relief valve 115 is a keep solenoid valve (normal-opened solenoid valve). The keep solenoid valve has a permanent magnet, and while current is not flowing, the valve is open due to the magnetic force of the permanent magnet. When the current flows, the force of the electromagnet becomes greater than the magnetic force of the permanent magnet, and the valve becomes closed. The keep solenoid valves have the unique feature of being able to remain open when the electric power is lost.

The positive pressure sensor 121 is installed just before the connection port C1 of the FE joint 131 and detects the pressure in the upstream portion of the ink-circulation section 110. The positive pressure sensor 121 outputs a detection signal indicating the detected pressure to the controller 100. The negative pressure sensor 122 is provided immediately before the connection port C2 of the FE joint 136 and detects the pressure in the downstream portion of the ink-circulation section 110. The negative pressure sensor 122 outputs a detection signal indicating the detected pressure to the controller 100. The controller 100 receives the pressure detected by the positive pressure sensor 121 and the pressure detected by the negative pressure sensor 122 (see FIG. 3).

When recording images, etc., the controller 100 performs the front-end circulation, which circulates ink through the nozzles 33 of the head 30. At this time, the controller 100 controls the purge shutoff valve 117 to the open state, the supply valve 113, the negative pressure adjustment valve 114, the atmospheric relief valve 115, the exhaust valve 116, and the purge bypass valve 118 to the closed state, and drives the positive pressure pump 111. The controller 100 also drives the negative pressure pump 112 for a predetermined time at the start of the front-end circulation.

When the positive pressure pump 111 operates, the ink is pushed out into the ink channels of the ink-circulation section 110. The ink in the ink channels of the ink-circulation section 110 is drawn in by the operation of the negative pressure pump 112 at the start of front-end circulation. Thus, ink circulates between sub-tank 74 and the ejection sections 32A to 32C. The ejection sections 32A to 32C each include the plurality of nozzles 33. Some of the ink that reaches the ejection sections 32A to 32C is ejected from the nozzles 33, and the remainder returns to the sub-tank 74. Thus, the ink-circulation section 110 includes a positive pressure pump 111 to circulate ink between the sub-tank 74 and the nozzles 33 of the head 30.

When performing an exhaust circulation, etc., the controller 100 performs a back-end circulation, which circulates ink without passing through the nozzles 33 of the head 30.

At this time, the controller 100 controls the exhaust valve 116 and the purge shutoff valve 117 to the open state, the supply valve 113, negative pressure regulating valve 114, atmospheric relief valve 115, and the purge bypass valve 118 to the closed state, and drives the positive pressure pump 111. The resistance of the ink channel through the exhaust valve 116 is less than that of the ink channel through the ejection sections 32A to 32C. Therefore, the ink flows mainly in the ink channel via the exhaust valve 116, not in the ink channel via the ejection sections 32A to 32C. Therefore, air entering the ink-circulation section 110 can be discharged without letting air in through the nozzles 33.

When refilling ink from the ink cartridge 73 to the sub-tank 74, the controller 100 controls the supply valve 113 to the open state, the negative pressure regulating valve 114 and the atmospheric relief valve 115 to the closed state, and drives the negative pressure pump 112. The negative pressure pump 112 applies negative pressure to the air layer of the sub-tank 74, thereby replenishing ink from the ink cartridge 73 to the sub-tank 74.

<Error Handling Based on Nozzle Pressure>

In order to correctly record images in the printer 10, the meniscus of the nozzles 33 must be maintained. To maintain the meniscus of nozzles 33, the controller 100 acquires the pressure near the nozzle 33 of ink-circulation section 110 (hereinafter referred to as nozzle pressure NP) based on the pressure detected by the positive pressure sensor 121 and the pressure detected by the negative pressure sensor 122. The error processing is performed based on the acquired nozzle pressure NP. The nozzle pressure NP is, for example, the pressure in an individual ink channel connected to one nozzle 33, which is branched from the main ink channel connecting one end to the other in any of the ejection sections 32A to 32C. The nozzle pressure NP is an estimate of the pressure near the nozzles 33 based on the pressure detected by the positive pressure sensor 121 and the pressure detected by the negative pressure sensor 122, and is not an actual measurement of the pressure near the nozzles 33.

The controller 100 has three threshold values (a positive threshold TP, a negative first threshold TM1, and a negative second threshold TM2) with respect to nozzle pressure NP. The positive threshold TP is a positive value. The negative first threshold TM1 and the negative second threshold TM2 are negative values. The negative second threshold TM2 is smaller than the negative first threshold TM1. In other words, the relationship between the three threshold values is TM2<TM1<0<TP. The negative first threshold value TM1 is an example of the first threshold value. The negative second threshold value TM2 is an example of the second threshold value. The positive threshold value TP is an example of the third threshold value.

The controller 100 has a count value CNT that counts the number of times that the nozzle pressure NP is less than the negative first threshold TM1 and greater than the negative second threshold TM2. The count value CNT is initialized to 0 at the start of a circulation operation (front-end or back-end circulation) and is counted up according to the nozzle pressure NP being less than the negative first threshold value TM1 and greater than the negative second threshold value TM2. The controller 100 has a count threshold value TC with respect to the count value CNT. The positive threshold value TP, the negative first threshold value TM1, and the negative second threshold value TM2, and the count threshold value TC may be fixed values preset in the printer 10, or they may be values that change according to the operating conditions of the printer 10.

FIGS. 8A and 8B are referenced below to describe the error processing based on nozzle pressure by controller 100. The controller 100 first initializes the count value CNT to 0 (S1). Next, the controller 100 causes the ink-circulation section 110 to perform the circulation operation (S2). In step of S2, the controller 100 controls the pumps and valves in the ink-circulation section 110 to cause the ink-circulation section 110 to perform front-end or back-end circulation. The circulation operation is executed when the printer 10 is turned on and during printing, etc. The circulation operation is also executed when a predetermined time period has elapsed since the end of printing, in order to prevent the nozzles 33 from drying out. The circulation operation is also executed before the purge process.

Next, the controller 100 determines whether or not it is pressure detection timing (S3). In response to determining that the pressure detection timing is not arrived (S3: No), the controller 100 returns to the step of S2 and causes the ink-circulation section 110 to continue performing the circulation operation. In response to determining that the pressure detection timing is arrived (S3: Yes), the controller 100 proceeds to the step of S4. The controller 100 executes the step of S3 at predetermined time intervals, for example.

In the step of S4, the controller 100 acquires the pressure P1 detected by the positive pressure sensor 121 and the pressure P2 detected by the negative pressure sensor 122. Next, the controller 100 acquires the nozzle pressure NP based on the two pressures P1 and P2 acquired in the step of S4 (S5). In the step of S5, the controller 100 obtains, for example, the average (P1+P2)/2 of the two pressures P1 and P2 obtained in the step of S12 as the nozzle pressure NP. The controller 100 may obtain the nozzle pressure NP in a method other than the above based on the two pressures P1 and P2. For example, the controller 100 may obtain the nozzle pressure NP by proportionally dividing the two pressures P1 and P2 by the length of the ink channel from the positive pressure sensor 121 to the nozzles 33 and the length of the ink channel from the nozzles 33 to the negative pressure sensor 122.

Next, the controller 100 determines whether the nozzle pressure NP is greater than the positive threshold TP (S10). The controller 100 proceeds to the step of S20 in response to the determination that the nozzle pressure NP is less than the positive threshold TP (S10: No). In this case, the controller 100 determines whether the nozzle pressure NP is less than the negative second threshold TM2 (S20). The controller 100 determines that the nozzle pressure NP is greater than or equal to the negative second threshold TM2 (S20: No) and proceeds to the step of S30. In this case, the controller 100 determines whether the nozzle pressure NP is less than the negative first threshold TM1 (S30). In response to determining that the nozzle pressure NP is greater than or equal to the negative first threshold TM1 (S30: No), the controller 100 proceeds to the step of S2 and causes the ink-circulation unit 110 to continue performing the circulation operation.

The controller 100 proceeds to the step of S11 in response to the determination that the nozzle pressure NP is greater than the positive threshold TP in the step of S10 (S10: Yes). In this case, ink-circulation in the ink-circulation section 110 must be stopped immediately to prevent ink leakage from the nozzles 33. Therefore, the controller 100 forcibly terminates or stops the ink-circulation section 110 and controls the atmospheric relief valve 115 to be open (S11). Here, forced termination or forced stop means immediate termination without executing the normal stop sequence (see below). In the step of S11, the controller 100 immediately stops the positive pressure pump 111.

Next, the controller 100 displays an error message on the display 15 indicating that "an error has occurred in which the nozzle pressure exceeds the positive threshold" (described as "error of positive-side" in FIG. 8A) (S12). Next, the controller 100 records that "an error has occurred in which the nozzle pressure exceeds the positive threshold" in the EEPROM 104 (S13).

The controller 100 proceeds to the step of S21 in response to the determination that the nozzle pressure NP is less than the negative second threshold TM2 in the step of S20 (S20: Yes). In this case, ink-circulation in the ink-circulation section 110 must be stopped immediately to prevent air from entering from the nozzles 33. Therefore, the controller 100 forcibly terminates the ink-circulation section 110 and controls the atmospheric relief valve 115 to open (S21). The step of S21 is the same process as the step of S11.

Next, the controller 100 displays an error message on the display 15 indicating that "an error has occurred in which the nozzle pressure exceeds the negative second threshold" (described as "error 2 of negative side" in FIG. 8A) (S22). Next, the controller 100 records that "an error has occurred in which the nozzle pressure exceeds the negative second threshold" in the EEPROM 104 (S23).

The controller 100 proceeds to the step of S31 in response to the determination that the nozzle pressure NP is less than the negative first threshold TM1 in the step of S30 (S30: Yes). In this case, the controller 100 opens the negative pressure regulating valve 114 for a predetermined time (S31). The predetermined time is, for example, 0.1 second. When the negative pressure regulating valve 114 is opened, the pressure of the gas layer in the sub-tank 74 approaches atmospheric pressure and the nozzle pressure NP increases. Next, the controller 100 adds 1 to the count value CNT (S32).

Next, the controller 100 determines whether the count value CNT is greater than or equal to the count threshold TC (S33). The count threshold TC is, for example, 10 times. In response to the determination that the count value CNT is less than the count threshold TC (S33: No), the controller 100 proceeds to the step of S2 to have the ink-circulation unit 110 continue to perform the circulation operation.

The controller 100 proceeds to the step of S34 in response to the determination that the count value CNT exceeds the count threshold TC (S33: Yes). In this case, the controller 100 opens the negative pressure regulating valve 114 until the nozzle pressure reaches a predetermined level (S34). As a result, the pressure in the sub-tank 74 approaches atmospheric pressure and the nozzle pressure NP rises to the predetermined level.

Next, the controller 100 stops the circulation operation in the ink-circulation section 110 according to the normal stop sequence (S35). The normal stop sequence is a sequence in which the amount of ink circulating in the ink-circulation section 110 is gradually reduced to terminate ink-circulation. To gradually reduce the amount of ink circulating in the ink-circulation section 110, the controller 100 gradually controls the force of the positive pressure pump 111 to push ink into the ink channels in the ink-circulation section 110. Along with this, the controller 100 may control the negative pressure regulating valve 114 to be open for a predetermined time at a predetermined timing. The normal stop sequence is performed when the printer 10 is turned off, for example.

Next, the controller 100 displays an error message on the display 15 indicating that "an error has occurred in which the nozzle pressure exceeds the negative first threshold multiple times" (described as "error 1 of negative side" in FIG. 8B) (S36). Next, the controller 100 records that "an error has occurred in which the nozzle pressure exceeds the negative first threshold multiple times" in the EEPROM 104 (S37).

The controller 100 terminates the image recording process after executing steps of S13, S23, or S37. The user then turns off the printer 10. The user or maintenance worker removes the cause of the error by clearing the clogging of the filter 123, replacing the motor that is malfunctioning, or by other means. When the printer 10 is subsequently turned on, the controller 100 performs the maintenance process for the head 30 described above to form the meniscus of the nozzles 33. When the printer 10 is turned on before the cause of the error is removed, the controller 100 displays an error message on the display 15 indicating the type of error based on the type of error recorded in the EEPROM 104.

The controller 100 stops the operation of the ink-circulation section 110 according to the normal stop sequence in response to the determination of "Yes" in the step of S33 (S34). The controller 100 stops the operation of the ink-circulation section 110 without following the normal stop sequence (S11, S21) in response to having determined "Yes" in the step of S10 or S20. In the latter case, the controller 100 immediately stops the positive pressure pump 111. Therefore, when the operation is stopped without following the normal stop sequence, the time from the start of the stopping operation until the operation of the ink-circulation section 110 stops is shorter than when the operation is stopped according to the normal stop sequence.

Technical Effects of the Embodiments

As described above, the printer 10 in this embodiment has the sub-tank 74, the head 30 with the nozzles 33, the ink-circulation section 110 including the negative pressure pump 112, the negative pressure regulating valve 114, and the controller 100. The controller 100 acquires the nozzle pressure NP, which is the pressure of the ink-circulation section 110 near the nozzles 33. The controller 100 controls the negative pressure regulating valve 114 to open in response to the nozzle pressure NP being less than the negative first threshold value TM1 and greater than the negative second threshold value TM2 that is less than the negative first threshold value TM1.

According to the printer 10, when the nozzle pressure is less than the negative first threshold TM1 and greater than the negative second threshold TM2, the ink-circulation is not stopped unconditionally, but the negative pressure regulating valve 114 is opened to bring the pressure of the gas layer of the sub-tank 74 closer to the atmospheric pressure to make the nozzle pressure NP to be higher. Thus, ink-circulation can be suitably stopped based on the nozzle pressure NP without stopping the ink-circulation more than necessary. In addition, since printing is not stopped frequently, downtime of the printer 10 can be reduced.

The printer 10 is also equipped with the positive pressure sensor 121 for detecting the pressure in the upstream portion, of the ink-circulation section 110, that is located upstream of the nozzles 33, and the negative pressure sensor 122 for detecting the pressure in the downstream portion, of the ink-circulation section 110, that is located downstream of the nozzles 33. The controller 100 obtains the nozzle pressure NP based on the pressure detected by the positive pressure sensor 121 and the pressure detected by the negative pressure sensor 122. Thus, even if any pressure sensors cannot be placed near the nozzles 33, the nozzle pressure NP can be obtained based on the pressure detected by the positive pressure sensor 121 and the pressure detected by the negative pressure sensor 122, and ink-circulation can be suitably stopped based on the nozzle pressure NP.

The controller 100 also updates the count value CNT in response to the nozzle pressure NP being less than the negative first threshold TM1 and greater than the negative second threshold TM2, and in response to the count value CNT being greater than the count threshold TC, the negative pressure adjustment valve 114 is opened and then the ink-circulation section 110 is stopped according to the stop sequence. In a case that the number of times of the states in which the nozzle pressure NP becomes smaller than the negative first threshold TM1 and equal to or greater than the negative second threshold TM2 becomes more than the count threshold TC, the ink-circulation is stopped according to the stop sequence. Therefore, the ink-circulation can be suitably stopped based on the nozzle pressure NP.

The controller 100 stops the ink-circulation section 110 without following the stop sequence in response to the nozzle pressure NP being smaller than the negative second threshold TM2. By promptly stopping the ink-circulation when the nozzle pressure NP is smaller than the negative second threshold TM2, the air can be prevented from entering through the nozzles 33.

The controller 100 stops the ink-circulation section 110 without following the stop sequence in response to the nozzle pressure NP being greater than the positive threshold TP. By promptly stopping the ink-circulation when the nozzle pressure NP is greater than the positive threshold TP, the quality of the recorded image can be prevented from being degraded due to ink leaking from the nozzles 33.

The printer 10 is further equipped with the display 15. The controller 100 controls the display 15 to display the error message after stopping the ink-circulation section 110 based on the nozzle pressure NP. Thus, the user can be notified of the nozzle pressure abnormality.

The stop sequence is a sequence in which the amount of ink circulating in the ink-circulation section 110 is gradually reduced to terminate the ink-circulation. Thus, the ink-circulation can be stopped gradually over a certain amount of time.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

<Modifications>

Various modifications of the printer 10 for the above embodiment can be configured. For example, the printer 10 for the embodiment is a monochrome printer, but the printer for the modifications may be a color printer that ejects multiple types of color inks onto the sheet. In the case of the color printer, the controller obtains the nozzle pressure for each of the plurality of colors. In response to a certain nozzle pressure being less than the negative first threshold and greater than or equal to the negative second threshold, the controller controls the corresponding negative pressure regulating valve to open. The ink-circulation of the all colors is forcibly terminated in response to at least one of the nozzle pressures being greater than the positive threshold, or less than the negative second threshold. Further, the ink-circulation of the all colors is also forcibly terminated in response that the number of times of the states, in which at least one of the nozzle pressures is less than the negative first threshold and greater than the negative second threshold, exceeds the count threshold.

Although the printer 10 uses the maintenance section 60 having the caps 61, the sponge wipers 62, and the rubber wipers 63 to perform the purge process, the cap cleaning process, and the wiping process as the maintenance processes for the head 30, the maintenance section of the printer for the modifications may have other configurations. The maintenance section may execute other processes in addition to or instead of the above three processes as the maintenance process for the head. For example, the maintenance section may be equipped with the sponge wipers and may not be equipped with the rubber wipers.

In the above explanation, the controller 100 of the printer 10 obtains the nozzle pressure NP based on the pressure detected by the positive pressure sensor 121 and the pressure detected by the negative pressure sensor 122. However, the controller of the printer may obtain the nozzle pressure NP in a method other than the above. For example, the printer in the modifications may be equipped with a pressure sensor located near the nozzles, and the controller of the printer in the modifications may acquire the pressure detected by the pressure sensor as the nozzle pressure NP.

In the ink-circulation section 110 of the printer 10, the negative pressure pump 112 is connected to the air layer of the sub-tank 74 to provide negative pressure to the sub-tank 74. In the ink-circulation section of the printer for the modifications, the negative pressure pump is installed on the ink channel in the same way as the positive pressure pump. Even in this case, the ink in the ink channel may be drawn in.

In the above explanation, the controller 100 of the printer 10 compares the nozzle pressure NP to the negative second threshold TM2 after comparing the nozzle pressure NP to the positive threshold TP. However, the controller 100 of the printer 10 may compare the nozzle pressure NP to the positive threshold TP after comparing the nozzle pressure NP to the negative second threshold TM2. Further, the controller of the printer of the modifications may also perform other processing when an error is detected based on the nozzle pressure. For example, when the controller detects an error based on the nozzle pressure, the controller may notify the occurrence of the error to other devices connected via the communication interface.

What is claimed is:

1. A liquid discharge apparatus comprising:

a reservoir configured to store a liquid;

a head in which a nozzle is opened;

a liquid circulator including a negative pressure pump, the liquid circulator being configured to circulate the liquid between the reservoir and the nozzle;

a negative pressure regulating valve configured to regulate communication between a gas layer of the reservoir and an atmosphere;

a positive pressure sensor configured to detect a pressure in an upstream area, of the liquid circulator, located upstream of the nozzle;

a negative pressure sensor configured to detect a pressure in a downstream area, of the liquid circulator, located downstream of the nozzle, and a controller configured to perform:

obtaining a nozzle pressure in an area, of the liquid circulator, near the nozzle, based on a pressure detected by the positive pressure sensor and a pressure detected by the negative pressure sensor; and controlling the negative pressure regulating valve to open, in response to the nozzle pressure being less than a first threshold value that is a negative value and greater than a second threshold value that is less than the first threshold value.

2. The liquid discharge apparatus according to claim 1, wherein the controller is configured to perform:

updating a count value in response to the nozzle pressure being less than the first threshold value and greater than or equal to the second threshold value; and stopping the liquid circulator according to a stop sequence after opening the negative pressure regulating valve, in response to the count value being greater than or equal to a threshold value corresponding to the count value.

3. The liquid discharge apparatus according to claim 2, wherein the controller is configured to perform stopping the liquid circulator regardless of the stop sequence in response to the nozzle pressure being less than the second threshold value.

4. The liquid discharge apparatus according to claim 2, wherein the controller is configured to perform stopping the liquid circulator regardless of the stop sequence in response to the nozzle pressure being greater than a third threshold value that is a positive value.

5. The liquid discharge apparatus according to claim 2, further comprising a display, wherein the controller is configured to control the display to indicate an error message after stopping the liquid circulator based on the nozzle pressure.

6. The liquid discharge apparatus according to claim 2, wherein the controller is configured to perform stopping the liquid circulator during the stop sequence such that a quantity of the liquid circulating in the circulator is decreased.

* * * * *